(12) United States Patent
Hu

(10) Patent No.: US 8,560,617 B2
(45) Date of Patent: Oct. 15, 2013

(54) MULTI-SOURCE TRANSMISSION SYSTEM AND METHOD OF INSTANT MESSAGING FILE

(75) Inventor: Peng Hu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 154 days.

(21) Appl. No.: 13/170,924

(22) Filed: Jun. 28, 2011

(65) Prior Publication Data

US 2011/0258277 A1 Oct. 20, 2011

Related U.S. Application Data

(63) Continuation of application No. PCT/CN2009/076159, filed on Dec. 29, 2009.

(30) Foreign Application Priority Data

Dec. 29, 2008 (CN) .......................... 2008 1 0187348

(51) Int. Cl.
*G06F 15/16* (2006.01)

(52) U.S. Cl.
USPC ....................................................... 709/206

(58) Field of Classification Search
USPC ....................................................... 709/206
See application file for complete search history.

(56) References Cited

U.S. PATENT DOCUMENTS

| 7,693,958 B2 * | 4/2010 | Teodosiu et al. ............. 709/217 |
| 7,706,260 B2 * | 4/2010 | Cohen et al. .................. 370/229 |
| 7,882,139 B2 * | 2/2011 | Zou et al. ...................... 707/798 |
| 8,156,152 B2 * | 4/2012 | Zou et al. ...................... 707/798 |
| 2004/0107242 A1 | 6/2004 | Vert et al. |
| 2009/0177792 A1 * | 7/2009 | Guo et al. ...................... 709/231 |

FOREIGN PATENT DOCUMENTS

| CN | 1514578 A | 7/2004 |
| CN | 1889485 A | 1/2007 |
| CN | 101150410 A | 3/2008 |
| CN | 101166190 A | 4/2008 |
| CN | 101184055 A | 5/2008 |
| CN | 101465824 A | 6/2009 |

OTHER PUBLICATIONS

Chinese Office Action for Chinese Patent Application No. 200810187348.0, dated Jul. 14, 2010, and English translation thereof.
International Search Report for International Patent Application No. PCT/CN2009/076159, dated Apr. 15, 2010, and English translation thereof.

* cited by examiner

*Primary Examiner* — Alicia Baturay

(57) ABSTRACT

A multi-source transmission system of an IM file which includes a sender IM terminal and a receiver IM terminal connected through a network to exchange data. The receiver IM terminal is configured to search for replicas of a file according to file information sent by the sender IM terminal. When at least one replica is found, the IM terminal receives the file from at least two file sources by using a multi-source mode. The at least two file sources include the sender IM terminal and a file source of the at least one replica. A conventional P2SP system is used to search for the replicas, and the file with a replica is received by using the multi-source transmission mode.

12 Claims, 8 Drawing Sheets

MULTI-SOURCE TRANSMISSION SYSTEM AND METHOD OF INSTANT MESSAGING FILE

CROSS-REFERENCE TO RELATED APPLICATIONS

This application is a continuation of International Application No. PCT/CN2009/076159, filed Dec. 29, 2009. This application claims the benefit and priority of Chinese Patent Application No. 200810187348.0, filed Dec. 29, 2008. The entire disclosures of each of the above applications are incorporated herein by reference.

FIELD

The present disclosure relates to digital data processing technologies and to a multi-source transmission system for an Instant Messaging file.

BACKGROUND

This section provides background information related to the present disclosure which is not necessarily prior art.

Instant Messaging (IM) system is a main application on Internet, and in the IM system users perform Peer to Peer (P2P) based file transmission through IM terminals. In order to improve the efficiency of file transmission, a conventional method for accelerating data transmission between IM terminals includes selecting multiple relay nodes according to a specific rule. This enables implementing multi-path data transmission between a sender IM terminal and a receiver IM terminal, thereby further utilizing uplink-downlink bandwidth between the two terminals. In order to make the selected relay nodes work normally, the relay nodes should be selected according to route quality and be determined by using a shortest path algorithm.

At present, a Peer to Server and Peer (P2SP) mode is applied widely on the Internet. In the P2SP mode, through a concentrated index database, steady server resources, and P2P resources which are separated originally are integrated, and a plurality of network resource indexes are collected. By using the P2SP mode, a user not only can receive files from other user terminals in a multi-source mode according to specific P2P protocols, but can also receive files from public steady servers in the multi-source mode according to general protocols, such as HTTP and FTP. Therefore, by using the P2SP mode, the resources are more abundant, the speed of file transmission is faster and the file transmission is more stable.

SUMMARY

This section provides a general summary of the disclosure, and is not a comprehensive disclosure of its full scope or all of its features.

Various embodiments provide a multi-source transmission system of an IM file to improve the efficiency of file transmission.

The multi-source transmission system of an IM file includes a sender IM terminal and a receiver IM terminal which are connected through a network and exchange data with each other;

the receiver IM terminal is configured to search for replicas of a file according to file information sent by the sender IM terminal, and when at least one replica is found, receives the file from at least two file sources by using a multi-source transmission mode, wherein the at least two file sources comprise the sender IM terminal and a file source of the at least one replica.

Various embodiments also provide a multi-source transmission method of an IM file, applied between a sender IM terminal and a receiver IM terminal, and include:

generating, by the sender IM terminal, file information and sending the file information to the receiver IM terminal;

searching for, by the receiver IM terminal, replicas of the file according to the file information;

when at least one replica is found, receiving, by the receiver IM terminal, the file from at least two file sources by using a multi-source transmission mode, wherein the at least two file sources comprises the sender IM terminal and a file source of the at least one replica.

In various embodiments, the replica of a file is searched for by using a conventional P2SP system, and the file with a replica is received by using a multi-source transmission method, thereby improving the efficiency of file transmission, bandwidth utilization ratio, and the speed of file transmission.

Further areas of applicability will become apparent from the description provided herein. The description and various embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Various embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Various embodiments provide a multi-source transmission system of an IM file.

Based on distribution of files on the Internet, files transmitted between users are generally divided into files with a replica and files without a replica. A file with a replica is a file which is spread publicly on the Internet and has several replicas, such as a popular music file and a movie file. A file without a replica is a file which does not have a replica, such as a document or picture made by a user. According to the characteristics of the two kinds of files in this embodiment, the replicas of a file are searched for on the Internet by using a P2SP mode. If the replicas are found, the receiver IM terminal receives the file from file sources of the replicas by using a multi-source transmission mode, so as to improve the efficiency of file transmission.

Figure 1:
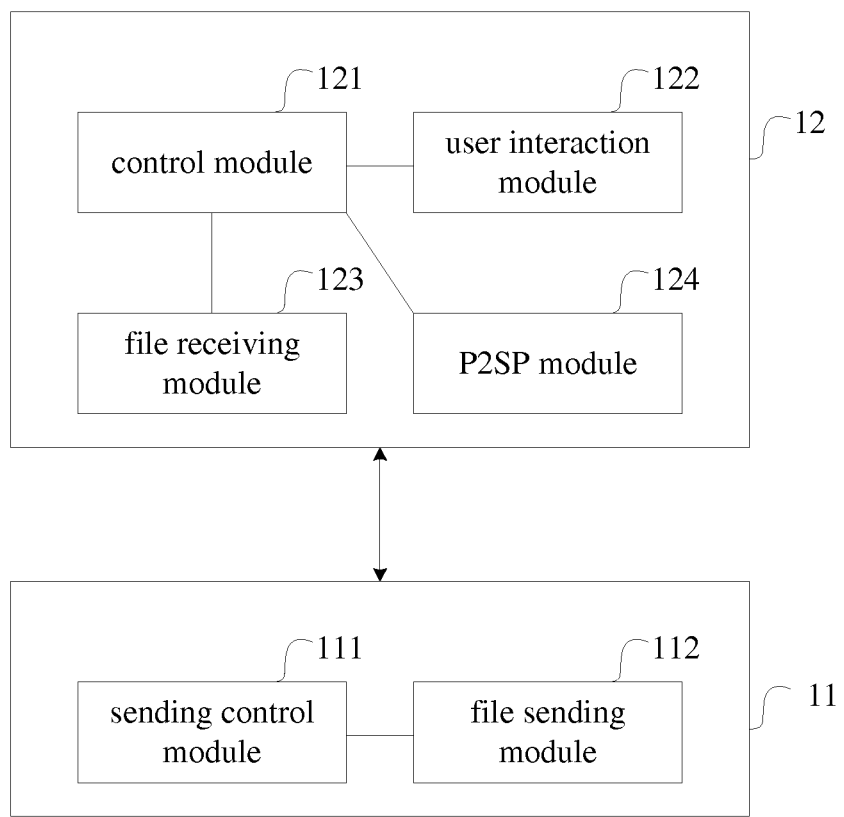
FIG. 1 is a schematic diagram illustrating the structure of a multi-source transmission system of an IM file in accordance with various embodiments.

Referring to FIG. 1, the multi-source transmission system of an IM file provided by this embodiment includes a sender IM terminal 11 and a receiver IM terminal 12. The sender IM terminal 11 and the receiver IM terminal 12 are connected with each other through a network and exchange data with each other through the network.

The receiver IM terminal 12 includes a control module 121 for controlling file transmission, a user interaction module 122 for performing user interaction, a file receiving module 123 connected with the sender IM terminal 11 and for exchanging data with the sender IM terminal 11, and a P2SP module 124 connected with file sources respectively and for exchanging data with the file sources.

The sender IM terminal 11 includes a sending control module 111 for controlling file transmission according to a request of the receiver IM terminal 12, and a file sending module 112 for sending a file to the receiver IM terminal 12.

Figure 2:
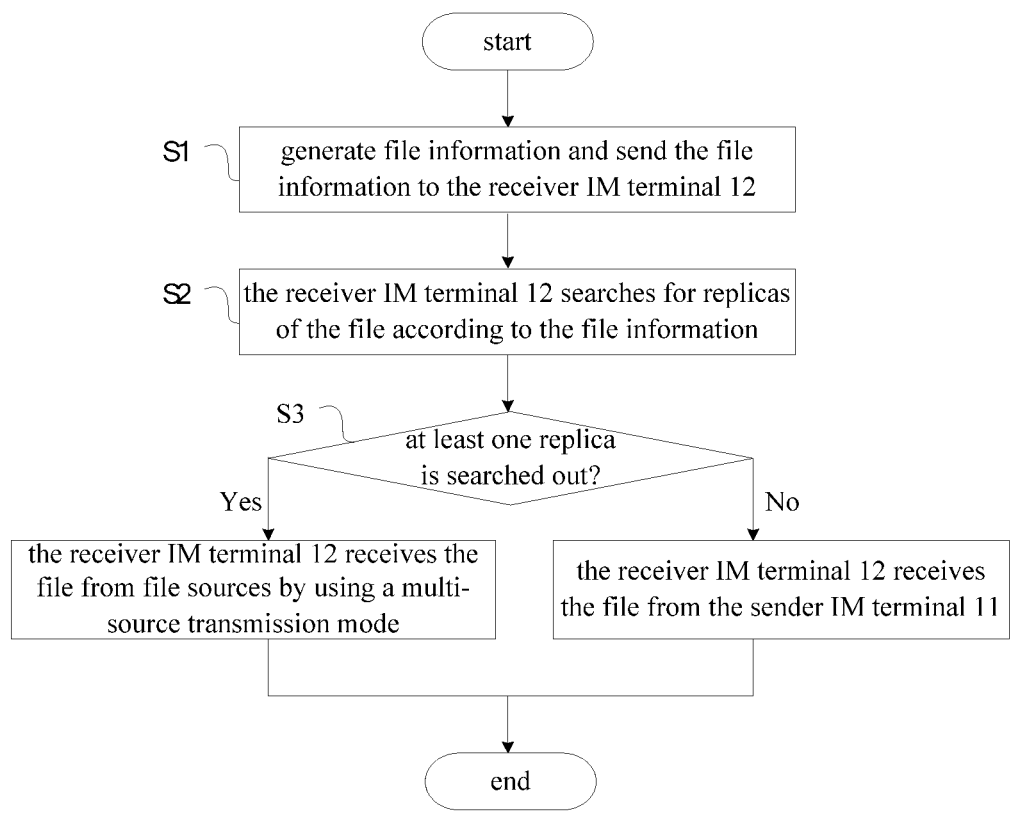
FIG. 2 is a flowchart illustrating a work procedure of a multi-source transmission system of an IM file in accordance with various embodiments.

Referring to FIG. 2, the process of the multi-source transmission system of an IM file of the various embodiments includes the following:

Block S1, the sender IM terminal 11 generates file information and sends the file information to the receiver IM terminal 12.

Block S2, the receiver IM terminal 12 searches for replicas of the file according to the file information.

Block S3, if at least one replica is found, the receiver IM terminal 12 receives the file from file sources by using a multi-source transmission mode. If no replica is found, the receiver IM terminal 12 receives the file from the sender IM terminal 11.

The above network may be the Internet, a local area network or a private network. The IM terminal can include a client program, a program running in a browser, and the IM terminal is installed or run on a computer, a terminal device, or a hand-held data processing device.

The above file source refers to an entity where at least one file or replica is located, and may include the sender IM terminal 11 and the file source of the replica, such as a personal computer, a terminal device, a network hard disc or a server. The file may have multiple replicas distributed on multiple file sources, and one file source may include multiple replicas.

The receiver IM terminal 12 sends a file transmission request to at least two file sources including the sender IM terminal 11 respectively, and receives, by using a multi-source transmission mode, the file from at least two file sources responding to the file transmission request. The sending control module 111 controls file transmission according to the file transmission request of the receiver IM terminal 12. That is, the receiver IM terminal 12 performs file transmission scheduling, adjusts the file transmission request to be sent to the file sources, the sending control module 111 sends the file to the receiver IM terminal 12 according to the file transmission request.

In view of data flow, the file transmission between the IM terminal and the file sources mainly includes a P2P direct transmission mode and a server relay mode. In the P2P direct transmission mode, a network connection is established directly between the sender IM terminal and the receiver IM terminal, and the speed of file transmission is affected by the network connection state provided by network operators of the two parties. In the server relay mode, a relay server for relaying data is configured, and takes an important additional part in the file transmission when the P2P direct transmission between the sender IM terminal and the receiver IM terminal is unavailable or the quality of the network connection between the two parties is bad, and thus the service is stable.

In view of the real-time performance, the file transmission between conventional IM terminals includes on-line transmission and off-line transmission. In the on-line transmission, the sender IM terminal and the receiver IM terminal are both on-line, and thus both the P2P direct transmission mode and the server relay mode may be used. In the off-line transmission, the sender IM terminal and the receiver IM terminal are not on-line at the same time. That is, an off-line file server is used to implement the file transmission between the sender IM terminal and the receiver IM terminal. The off-line file server is taken as a receiver device firstly, and the sender IM terminal sends the file to the off-line file server to be stored temporarily. After the receiver IM terminal is linked to the off-line file server, the off-line file server is taken as a sender and sends the file to the receiver IM terminal, so as to implement the off-line transmission. The off-line file server may also be taken as a special terminal device which usually adopts the P2P direct transmission mode during the file transmission.

Based on the above description, other various embodiments are provided in which online multi-source transmission of an IM file is implemented when a sender IM terminal and a receiver IM terminal which are both on-line.

Figure 3:
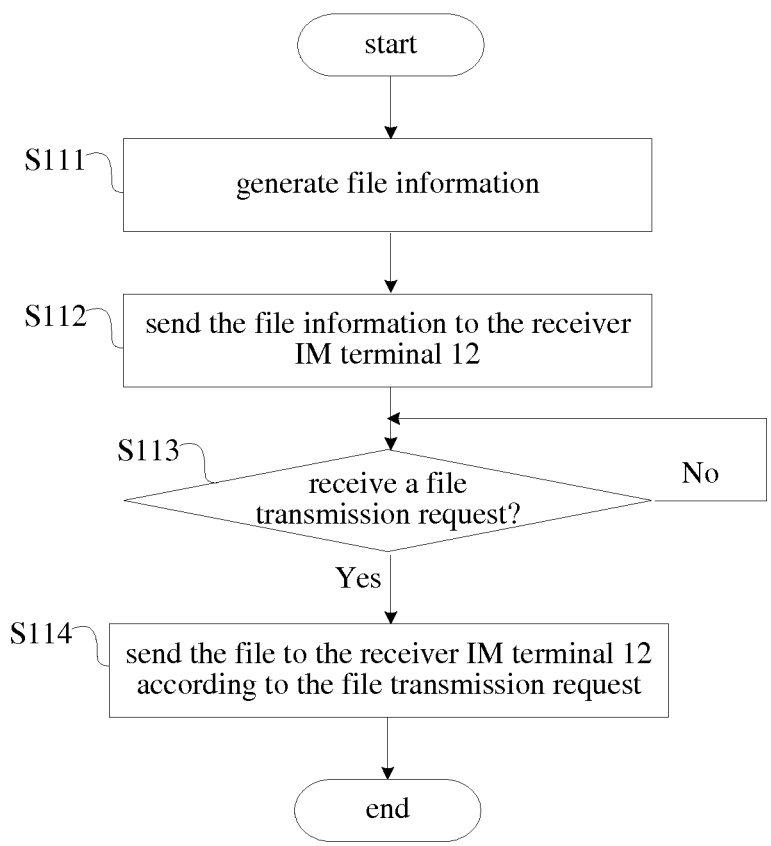
FIG. 3 is a flowchart illustrating a work procedure of a sender IM terminal in accordance with various embodiments.

Referring to FIG. 3, the specific work procedure of the sender IM terminal 11 in this embodiment includes the following:

Block S111, the sender IM terminal 11 generates file information.

Block S112, the sender IM terminal 11 sends the file information to the receiver IM terminal 12.

Block S113, if the sender IM terminal 11 receives a file transmission request from the receiver IM terminal 12, step S114 is performed. Otherwise, the sender IM terminal 11 keeps on waiting for the file transmission request.

Block S114, the sending control module 111, according to the file transmission request, controls the file sending module 112 to send the file to the receiver IM terminal 12.

In the above work procedure, the file information includes but is not limited to such information as a digital abstract, a file name, file length, etc. The specific algorithm of the digital abstract is identical with that in the P2SP system. For example, some P2SP system may divide the file into multiple segments according to a preset strategy and generate multiple digital abstracts for the segments respectively, while some P2SP system may generate the digital abstract for the whole file. In one various embodiment, a Message Digest algorithm 5 (MD5) may be used to generate the digital abstract. By using the MD5, a digital abstract or Hash value of 16 bytes is outputted for data of any size, thereby obtaining a good anti-conflict characteristic. If two files have the same digital abstract, the probability that the two files have the same contents is almost 1.

In the above work procedure, the mode for sending the file information or the file transmission mode is not limited, and the P2P direct transmission mode and the server relay mode may be adopted according to practical applications.

Figure 4:
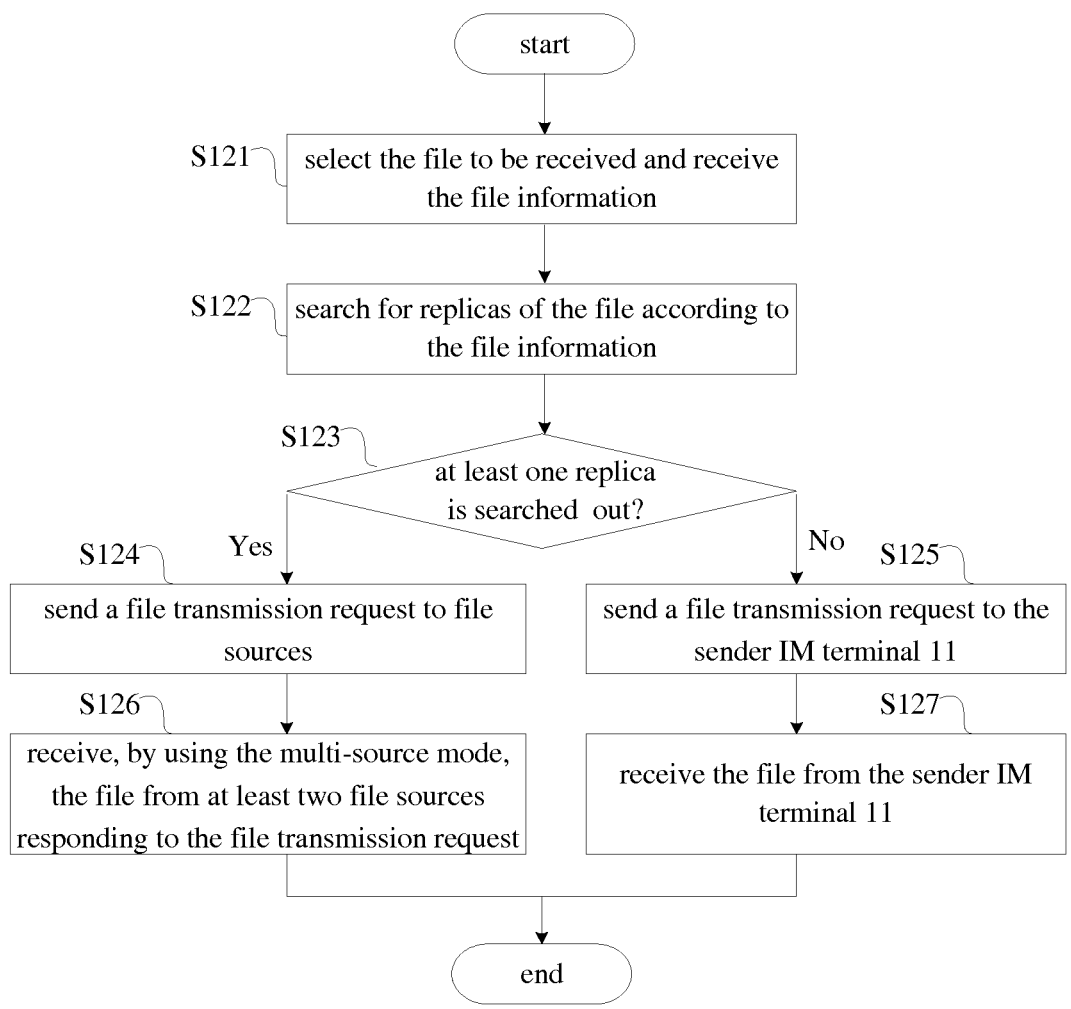
FIG. 4 is a flowchart illustrating a work procedure of a receiver IM terminal in accordance with various embodiments.

Referring to FIG. 4, the work procedure of the receiver IM terminal 12 in this embodiment includes the following:

Block S121, the user interaction module 122 selects the file to be received according to user operations, and the control module 121 controls the file receiving module 123 to receive the file information.

Block S122, the P2SP module 124 searches for replicas of the file according to the file information.

Block S123, if the P2SP module 124 searches out at least one replica, step S124 is performed. Otherwise, block S125 is performed.

Block S124, the control module 121 controls the P2SP module 124 to send a file transmission request to file sources, where the file sources include the sender IM terminal 11 and the file source of the at least one replica.

Block S125, the control module 121 controls the file receiving module 123 to send a file transmission request to the sender IM terminal 11.

Block S126, the control module 121 controls the P2SP module 124 to receive, by using the multi-source mode, the file from at least two file sources responding to the file transmission request.

Block S127, the control module 121 controls the file receiving module 123 to receive the file from the sender IM terminal 11.

In order to improve the efficiency of file transmission, the control module 121 may directly receive the file from the sender IM terminal 11 in block S121 when controlling the file receiving module 123 to receive the file information, and thus can control the file receiving module 123 to send the file transmission request in block S125 without needing to wait for the result of searching for the replicas by the P2SP module 124.

In block S122, the P2SP module 124 sends a request of searching for the replicas to an inquiry server of the P2SP system according to an inquiry protocol interaction criterion of the P2SP system, and the request at least includes the file information, e.g. the digital abstract. In addition, the P2SP module 124 may search for the replicas in multiple P2SP systems as long as inquiry protocol interaction criterions of the P2SP systems are met.

Block S124 includes the control module 121 divides the file into multiple file blocks according to states of the file sources found by the P2SP module 124 and file download protocol interaction criterions of the P2SP systems to which the file sources belong respectively, and respectively requests the file sources for the file blocks according to the connection states of the file sources.

In Block S126, after receiving a response to the file transmission request from at least two file sources, the P2SP module 124 receives the file blocks from the at least two file sources. The control module 121 performs file transmission scheduling according to the receiving state of the file, and adjusts the file transmission request sent to the file sources including the sender IM terminal 11, so as to implement multi-source transmission of the file. The above processing is performed until the sender IM terminal 12 receives all file blocks to form the whole file.

In the above work procedure, if the P2SP module 124 does not find any replica, the control module 121 may divide the file into multiple file blocks or not divide the file. If the control module 121 divides the file, the file receiving module 123 requests the sender IM terminal 11 for all the file blocks, and receives all the file blocks to form the whole file.

In addition, in the procedure of file transmission, the control module 121 calculates the progress of receiving the file from the sender IM terminal 11 and other file sources, performs file transmission scheduling and adjusts the file transmission request sent to the sender IM terminal 11 and/or other file sources according to the progress of receiving the file and the connection state of each file source. The control module 121 sends the progress to the sending control module 111 of the sender IM terminal 11, so that the sender IM terminal 11 can learn the progress of receiving the file by the receiver IM terminal 12 and control the sending of the file according to the file transmission request. The file transmission request can include a file identity and file information/file block information, the file information may be file length, and the file block information may be an identity, e.g. a file block number, or may be an original address and offset of the file block. When adjusting the file or file block to be sent from the sender IM terminal 11, the control module 121 only needs to adjust the file identity and file information/file block information in the file transmission request and send out the adjusted file transmission request in the block S125.

The progress of receiving the file may be presented as the progress of receiving the file from each file source, or may be presented as a total progress obtained by counting the progress of receiving the file from each file source, and may be presented through a percentage, a progress bar or a progress value.

Based on the above description, various embodiments are provided to implement multi-source transmission of an IM file in an off-line case.

Figure 5:
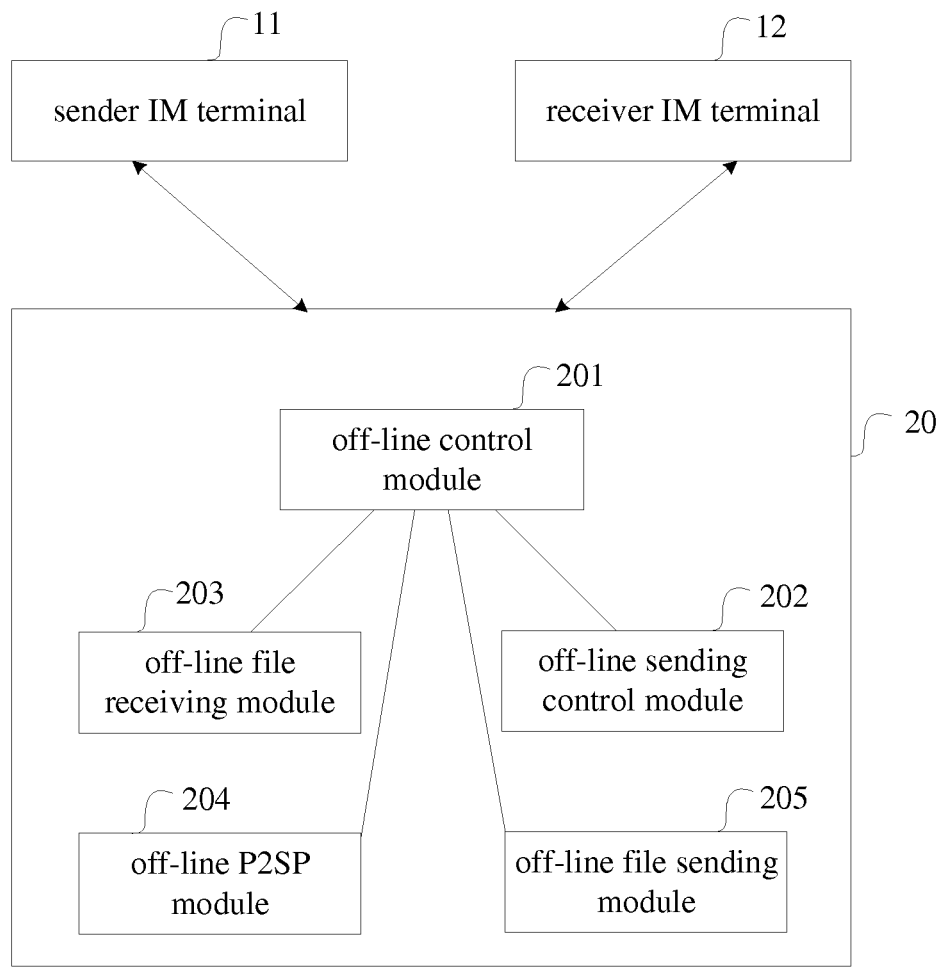
FIG. 5 is a schematic diagram illustrating the structure of a multi-source transmission system of an IM file in accordance with various embodiments.

Referring to FIG. 5, an off-line file server 20 is further included in this embodiment, which is connected with the sender IM terminal 11 and/or the receiver IM terminal 12 through a network and exchanges data with the sender IM terminal 11 and/or the receiver IM terminal 12. The off-line file server 20 includes an off-line control module 201 for controlling file transmission, an off-line file receiving module 203 connected with the sender IM terminal 11 and for exchanging data with the sender IM terminal 11, an off-line P2SP module 204 connected with file sources respectively and for exchanging data with the file sources, an off-line sending control module 202 for controlling the file transmission according to the request of the receiver IM terminal 12, and an off-line file sending module 205 for sending the file to the receiver IM terminal 12.

Figure 6:
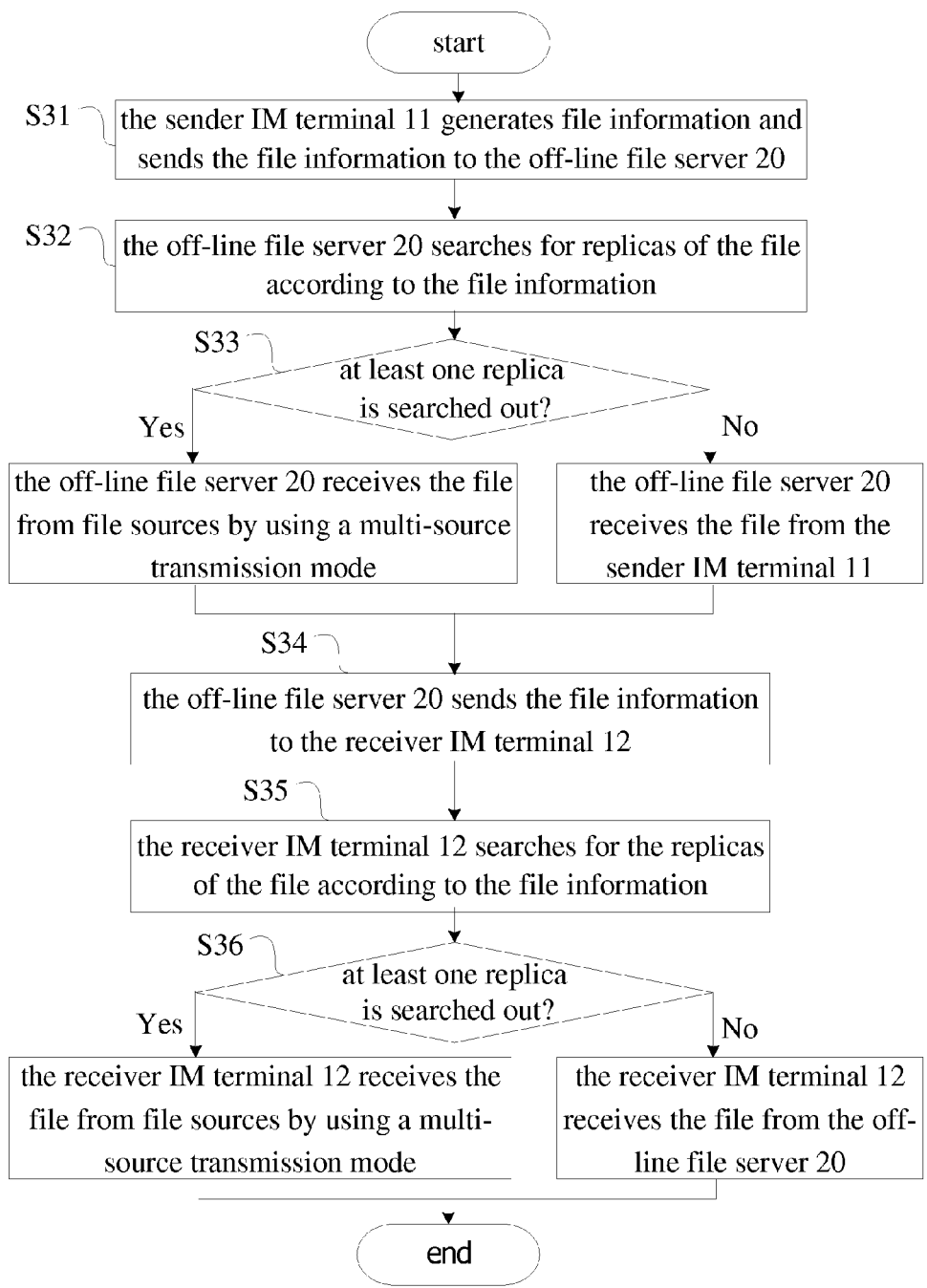
FIG. 6 is a flowchart illustrating a work procedure of a multi-source transmission system of an IM file in accordance with various embodiments.

The work procedure of this embodiment is similar to the embodiment of FIG. 1. The off-line file server 20 is taken as a receiver device at first, and receives the file from the sender IM terminal 11 according to the work procedure shown in FIG. 2, and then the off-line file server 20 is taken as a sender device, and sends the file to the receiver IM terminal 12 according to the work procedure shown in FIG. 2: Referring to FIG. 6, the work procedure of this embodiment includes the following:

Block S31, the sender IM terminal 11 generates file information and sends the file information to the off-line file server 20.

Block S32, the off-line file server 20 searches for replicas of the file according to the file information.

Block S33, if at least one replica is found, the off-line file server 20 receives the file from file sources by using a multi-source transmission mode, where the file sources include the sender IM terminal 11 and the file source of the at least one replica. If no replica is found, the off-line file server 20 receives the file from the sender IM terminal 11.

Block S34, the off-line file server 20 sends the file information to the receiver IM terminal 12.

Block S35, the receiver IM terminal 12 searches for the replicas of the file according to the file information.

Step S36, if at least one replica is found, the receiver IM terminal 12 receives the file from file sources by using the multi-source transmission mode, where the file sources include the off-line file server and the file source of the at least one replica. If no replica is found, the receiver IM terminal 12 receives the file from the off-line file server 20.

In the above work procedure, the mode for sending the file information and the file transmission mode are not limited, and the P2P direct transmission mode and the server relay mode may be adopted according to practical applications.

The file source described above may include the off-line file server 20.

Figure 7:
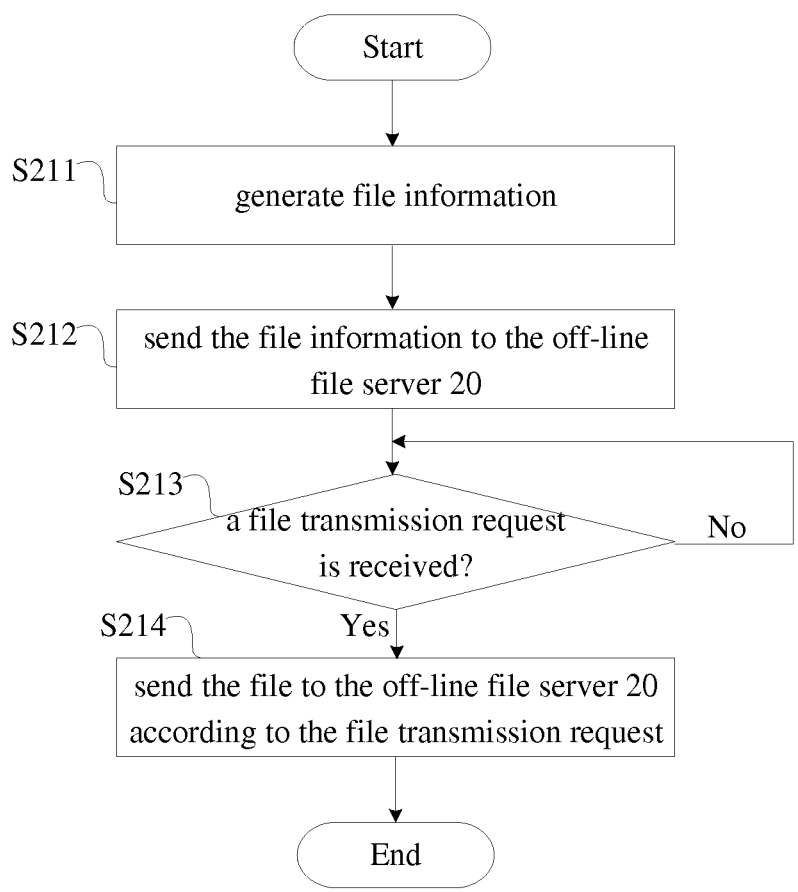
FIG. 7 is a flowchart illustrating a work procedure of a sender IM terminal in accordance with various embodiments.

Referring to FIG. 7, the work procedure of the sender IM terminal 11 in various embodiments includes the following:

Block S211, the sender IM terminal 11 generates file information.

Block S212, the sender IM terminal 11 sends the file information to the off-line file server 20.

Block S213, if the sender IM terminal 11 receives a file transmission request from the off-line file server 20, block S214 is performed. Otherwise, the sender IM terminal 11 keeps on waiting for the file transmission request.

Block S214, the sending control module 111, according to the file transmission request, controls the file sending module 112 to send the file to the off-line file server 20.

The above procedure is similar to the work procedure of the sender IM terminal 11 shown in FIG. 3. The sender IM terminal 11 takes the off-line file server 20 as a receiver IM terminal 12 and sends the file to the off-line file server 20.

Figure 8:
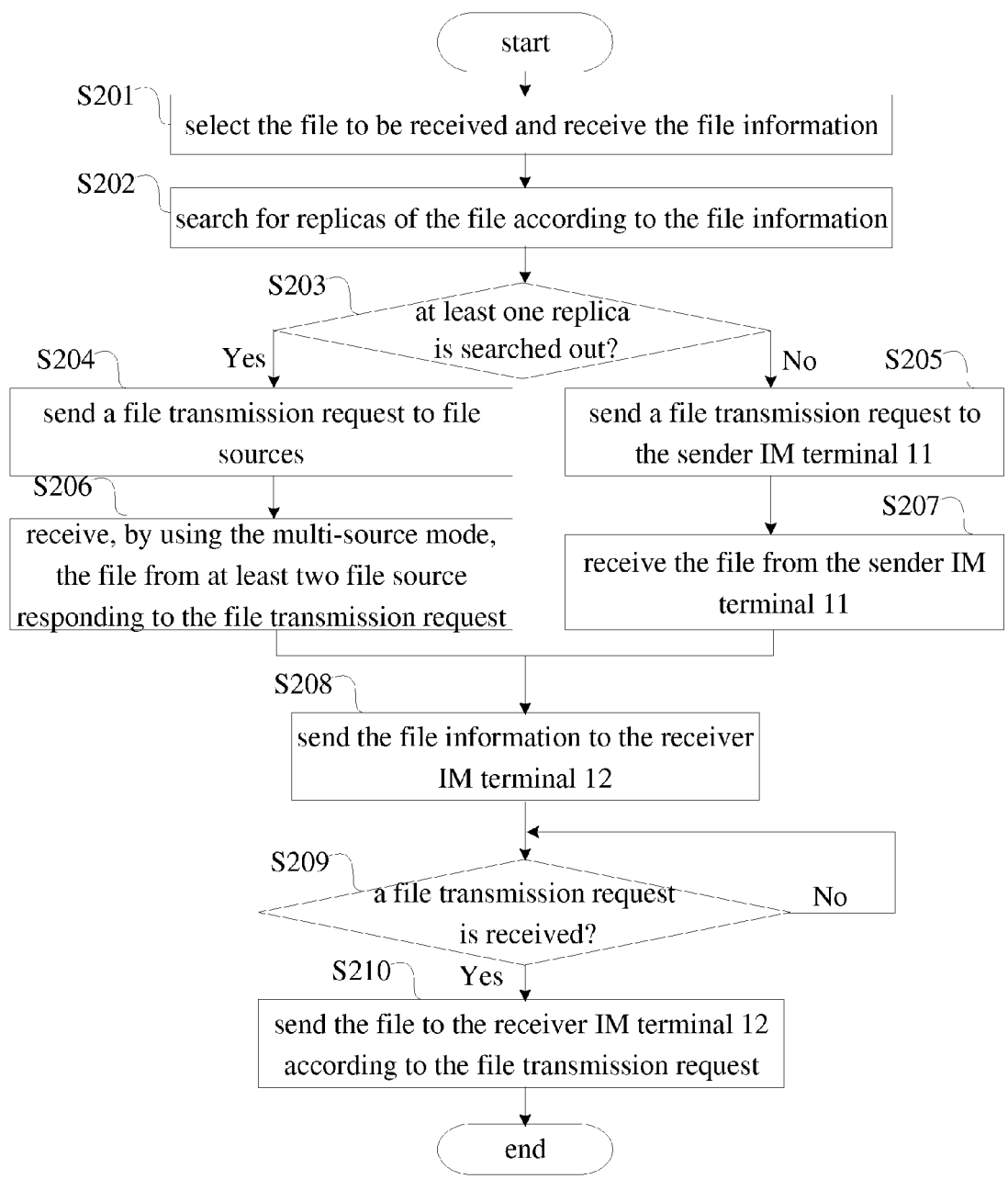
FIG. 8 is a flowchart illustrating a work procedure of an off-line file server in accordance with various embodiments.

Referring to FIG. 8, the specific work procedure of the off-line file sever 20 in this embodiment includes the following:

Block S201, the off-line control module 201 selects the file to be received, and controls the off-line file receiving module 203 to receive the file information.

Block S202, the off-line P2SP module 204 searches for replicas of the file according to the file information.

Block S203, if the off-line P2SP module 204 finds at least one replica, block S204 is performed. Otherwise, block S205 is performed.

Block S204, the off-line control module 201 controls the off-line P2SP module 204 to send a file transmission request to file sources, where the file sources include the sender IM terminal 11 and the file source of at least one replica.

Block S205, the off-line control module 201 controls the off-line file receiving module 203 to send a file transmission request to the sender IM terminal 11.

Block S206, the off-line control module 201 controls the off-line P2SP module 204 to receive the file from at least two file sources responding to the file transmission request by using the multi-source transmission mode.

Block S207, the off-line control module 201 controls the off-line file receiving module 203 to receive the file from the sender IM terminal 11.

Block S208, the off-line file sever 20 sends the file information to the receiver IM terminal 12.

Block S209, if the off-line file sever 20 receives a file transmission request from the receiver IM terminal 12, step S210 is performed. Otherwise, the off-line file sever 20 keeps on waiting for the file transmission request.

Block S210, the off-line sending control module 202, according to the file transmission request, controls the off-line file sending module 205 to send the file to the receiver IM terminal 12.

The above work procedure of the off-line file server 20 includes two sub-procedures: a receiving sub-procedure including blocks S201-S207 and a sending sub-procedure including blocks S208-S210. In the receiving sub-procedure, the off-line file server 20 is taken as a receiver device, and the work procedure is similar to that of the receiver IM terminal 12 in the embodiment of FIG. 2. In the receiving sub-procedure, the off-line file server 20 may search multiple P2SP systems respectively for the replicas to improve the hit rate of file searching, may also divide the file into multiple file blocks and receive the file blocks respectively, and may further calculate the progress of receiving the file and perform the file transmission scheduling. In the sending sub-procedure, the off-line file server 20 is taken as a sender device, and the work procedure is similar to that of the sender IM terminal 11 in the embodiment of FIG. 3. The difference lies in that the off-line server does not generate the file information, but forwards the received file information to the receiver IM terminal 12, and sends the file to the receiver IM terminal 12 according to the file transmission request.

In block S208, after the receiver IM terminal 12 logs on the IM system, the IM system activates the sending sub-procedure of the off-line file server 20.

The work procedure of the receiver IM terminal 12 in this embodiment is similar to that in the embodiment of FIG. 4. The difference lies in that the off-line file server 20 is taken as the sender IM terminal 11. If at least one replica is found, the receiver IM terminal 12 receives the file from the off-line file server 20 and at least one file source of the replica by using the multi-source transmission mode, and if no replica is found, the receiver IM terminal 12 receives the file from the off-line file server 20.

The control module 121 of the receiver IM terminal 12 and/or the off-line control module 201 of the off-line file server 20 may perform file transmission scheduling at any moment according to the speed of receiving the file from at least two file sources or according to the connection state between the receiver IM terminal 12 and the at least two file sources or between the off-line file server 20 and the at least two file sources, and adjusts the proportion of receiving the file from the sender IM terminal 11, the off-line file server 20 and/or at least one other file source by adjusting the file transmission request to improve the efficiency of file transmission. When needing to adjust the file or file block to be sent from the sender IM terminal 11 or the off-line file server 20, the control module 121 and/or the off-line control module 201 only need to adjust the file identity and the file information/file block information in the file transmission request and send out the adjusted file transmission request.

In this embodiment, the coupling degree between the file transmission of the IM terminal and the P2SP system is low, so this embodiment is easy to be implemented based on the prior art, development cost is low, and it is unnecessary to improve the P2SP system.

In order to further improve the efficiency of file transmission, other various embodiments are provided.

In various embodiments, the receiver IM terminal 12 may perform a flexible share strategy after receiving the file. For example, the receiver IM terminal 12 inherits a report function of the P2SP mode, sends a file data report message to an index server of the P2SP system after receiving the file, registers the file sources and reports the replicas of the file. Through the report procedure, the file has more replicas in the network, and if there is a transmission requirement for the file, the efficiency of file transmission will be improved by using the replicas.

One various embodiment provides a multi-source transmission method of an IM file based on the sender IM terminal 11 and the receiver IM terminal 12 to implement the multi-source transmission of the IM file.

Referring to FIG. 2, the method includes the following:

Block S1, the sender IM terminal 11 generates file information and sends the file information to the receiver IM terminal 12.

Block S2, the receiver IM terminal 12 searches for replicas of the file according to the file information.

Block S3, if at least one replica is found, the receiver IM terminal 12 receives the file from file sources including the sender IM terminal 11 by using a multi-source transmission mode. If no replica is found, the receiver IM terminal 12 receives the file from the sender IM terminal 11.

Other various embodiments are also provided, in which online multi-source transmission of an IM file is implemented between a sender IM terminal and a receiver IM terminal which are both on-line.

Referring to FIG. 3, the work procedure of the sender IM terminal 11 in the various embodiments includes the following:

Block S111, the sender IM terminal 11 generates file information.

Block S112, the sender IM terminal 11 sends the file information to the receiver IM terminal 12.

Block S113, if the sender IM terminal 11 receives a file transmission request from the receiver IM terminal 12, step S114 is performed. Otherwise, the sender IM terminal 11 keeps on waiting for the file transmission request.

Block S114, the sender IM terminal 11 send the file to the receiver IM terminal 12 according to the file transmission request.

Referring to FIG. 4, the work procedure of the receiver IM terminal 12 in the various embodiments includes the following:

Block S121, the receiver IM terminal 12 selects the file to be received according to user operations and receives the file information.

Block S122, the receiver IM terminal 12 searches for replicas of the file according to the file information.

Block S123, if the receiver IM terminal 12 finds at least one replica, step S124 is performed. Otherwise, step S125 is performed.

Block S124, the receiver IM terminal 12 sends a file transmission request to the file sources including the sender IM terminal 11.

Block S125, the receiver IM terminal 12 sends a file transmission request to the sender IM terminal 11.

Block S126, the receiver IM terminal 12 receives the file from at least two file sources responding to the file transmission request by using the multi-source transmission mode.

Block S127, the receiver IM terminal 12 receives the file from the sender IM terminal 11.

In order to improve the efficiency of file transmission, the receiver IM terminal 12 may directly receive the file from the sender IM terminal 11 in block S121 when receiving the file information, and can send the file transmission request to the sender IM terminal 11 in block S125 without needing to wait for the result of searching for the replicas.

In block S122, the receiver IM terminal 12 sends a request of searching for the replicas to an index server of the P2SP system according to an inquiry protocol interaction criterion of the P2SP system, and the request at least includes the file information, e.g. a digital abstract. In addition, the receiver IM terminal 12 may search multiple P2SP systems as long as the inquiry protocol interaction criterions of the P2SP systems are met.

Specifically, block S124 includes that the receiver IM terminal 12 divides the file into multiple file blocks according to the states of the file sources found by the P2SP module 124 and the file download protocol interaction criterions of the P2SP systems to which the file sources belong, and the receiver IM terminal 12 respectively requests the file sources for the file blocks according to the connection states of the file sources.

In block S126, after receiving a response to the file transmission request from at least two file sources, the receiver IM terminal 12 receives the file blocks from the at least two file sources, performs file transmission scheduling according to the state of receiving the file, and adjusts the file transmission request sent to the sender IM terminal 11 and/or other file sources, so as to implement the multi-source transmission of the file. The above processing is performed until the sender IM terminal 12 receives all file blocks to form the whole file.

In the above work procedure, if the receiver IM terminal 12 does not find any replica, the receiver IM terminal 12 may divide the file into multiple file blocks or not divide the file. If the receiver IM terminal 12 divides the file, the receiver IM terminal 12 requests the sender IM terminal 11 for all the file blocks, and receives all the file blocks to form the whole file.

In addition, in the procedure of file transmission, the receiver IM terminal 12 calculates the progress of receiving the file from the sender IM terminal 11 and other file sources, performs file transmission scheduling and adjusts the file transmission request sent to the sender IM terminal 11 and/or other file sources according to the progress of receiving the file and the connection state between the receiver IM terminal 12 and each file source. The receiver IM terminal 12 sends the progress to the sender IM terminal 11, so that the sender IM terminal 11 can learn the progress of receiving the file by the receiver IM terminal 12 and control the sending of the file according to the file transmission request.

The progress of receiving the file may be presented as the progress of receiving the file from each file source, or may be presented as a total progress obtained by counting the progress of receiving the file from each file source, and may be presented through a percentage, a progress bar or a progress value.

Referring to FIG. 5, various embodiments are provided to implement multi-source transmission of an IM file in the off-line case, based on the off-line file server 20, the sender IM terminal 11 and the receiver IM terminal 12.

The work procedure of the various embodiments is similar to that of the FIG. 2. The off-line file server 20 is taken as a receiver device at first, and receives the file from the sender IM terminal 11 according to the work procedure shown in FIG. 2; and then the off-line file server 20 is taken as a sender device, and sends the file to the receiver IM terminal 12 according to the work procedure shown in FIG. 2. Referring to FIG. 6, the work procedure of this embodiment includes the following:

Block S31, the sender IM terminal 11 generates file information and sends the file information to the off-line file server 20.

Block S32, the off-line file server 20 searches for replicas of the file according to the file information.

Block S33, if at least one replica is found, the off-line file server 20 receives the file from file sources including the sender IM terminal 11 by using a multi-source transmission mode. If no replica is found, the off-line file server 20 receives the file from the sender IM terminal 11.

Block S34, the off-line file server 20 sends the file information to the receiver IM terminal 12.

Block S35, the receiver IM terminal 12 searches for the replicas of the file according to the file information.

Block S36, if at least one replica is found, the receiver IM terminal 12 receives the file from file sources including the off-line file server 20 by using the multi-source transmission mode. If no replica is found, the receiver IM terminal 12 receives the file from the off-line file server 20.

In the above embodiment, the file source may include the off-line file server 20. The solutions of generating the file information, dividing the file, requesting the file blocks from multiple file sources, calculating the progress of receiving the file, performing the file transmission scheduling, and reporting the replicas are similar to those in the embodiments described above, and are not described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-source transmission system of an Instant Messaging (IM) file, comprising a sender IM terminal and a receiver IM terminal which are connected with each other through a network and exchanges data with each other, and further comprising an off-line file server;
    the sender IM terminal is configured to generate file information and send the file information to the off-line file server;
    the off-line file server is configured to search replicas of the file according to the file information; when at least one replica is searched out, receive the file from at least two file sources by using a multi-source transmission mode, wherein the at least two file sources comprises the sender IM terminal and a file source of the at least one replica; when no replica is searched out, receive the file from the sender IM terminal; send the file information to the receiver IM terminal;
    the receiver IM terminal is configured to search for the replicas of the file according to file information sent by the off-line file server, and when at least one replica is searched out, receive the file from at least two file sources by using the multi-source transmission mode, wherein the at least two file sources comprise the off-line file server and a file source of the at least one replica; when no replica is searched out, receive the file from the off-line file server.

2. The system of claim 1, wherein the sender IM terminal is configured to control file transmission according to a file transmission request from the receiver IM terminal.

3. The system of claim 1, wherein file sources of the replicas belong to at least one Peer to Server and Peer (P2SP) system, and
    the receiver IM terminal is configured to search the at least one P2SP system for the replicas.

4. The system of claim 1, wherein
    the receiver IM terminal is further configured to divide the file into at least two file blocks according to the file source of the at least one replica, request the at least two file sources respectively for the file blocks, and receive all the file blocks from the at least two file sources to form the whole file.

5. The system of claim 1, wherein
    the receiver IM terminal is further configured to perform file transmission scheduling according to the state of receiving the file, and adjust a file transmission request sent to the sender IM terminal and/or the file source of the at least one replica;
    the sender IM terminal is further configured to send the file to the receiver IM terminal according to the file transmission request.

6. The system of claim 1, wherein the off-line file server is further configured to control the file transmission according to the file transmission request of the receiver IM terminal.

7. The system of claim 1, wherein file sources of the replicas belong to at least one P2SP system;
    the off-line file server is configured to search the at least one P2SP system for the replicas.

8. The system of claim 1, wherein
    the off-line file server is further configured to divide the file into at least two file blocks according to the file source of the at least one replica, request the at least two file sources respectively for the file blocks, and receive all the file blocks from the at least two file sources to form the whole file.

9. The system of claim 1, wherein
    the off-line file server is further configured to perform file transmission scheduling according to the state of receiving the file, and adjust the file transmission request sent to the sender IM terminal and/or the file source of the at least one replica;
    the sender IM terminal is further configured to send the file to the off-line file server according to the file transmission request; and/or
    the receiver IM terminal is further configured to perform file transmission scheduling according to the state of receiving the file, and adjust the file transmission request sent to the off-line file server and the file source of the at least one replica;
    the off-line file server is further configured to send the file to the receiver IM terminal according to the file transmission request.

10. A multi-source transmission method of an Instant Messaging (IM) file, applied between a sender IM terminal and a receiver IM terminal, and comprising:
    generating, by the sender IM terminal, file information and sending the file information to an off-line file server;
    searching for, by the off-line file server, replicas of the file according to the file information;
    when at least one replica is searched out, receiving, by the off-line file server, the file from at least two file sources by using a multi-source transmission mode, wherein the at least two file sources comprises the sender IM terminal and a file source of the at least one replica; when no replica is searched out, receiving the file from the sender IM terminal;
    sending, by the off-line file server, the file information to the receiver IM terminal;
    searching for, by the receiver IM terminal, the replicas of the file according to the file information;
    when at least one replica is searched out, receiving, by the receiver IM terminal, the file from at least two file sources by using the multi-source transmission mode, wherein the at least two file sources comprises the off-line file server and a file source of the at least one replica; when no replica is searched out, receiving the file from the off-line file server.

11. The method of claim 10, further comprising:

performing, by the receiver IM terminal, file transmission scheduling according to the state of receiving the file, and adjusting a file transmission request sent to the sender IM terminal and/or the file source of the at least one replica;

sending, by the sender IM terminal, the file to the receiver IM terminal according to the file transmission request.

12. The method of claim 10, further comprising:

performing, by the off-line file server, file transmission scheduling according to the state of receiving the file, and adjusting a file transmission request sent to the sender IM terminal and/or the file source of the at least one replica;

sending, by the sender IM terminal, the file to the off-line file server according to the file transmission request;

performing, by the receiver IM terminal, file transmission scheduling according to the state of receiving the file, and adjusting the file transmission request sent to the off-line file server and/or the file source of the at least one replica;

sending, by the off-line file server, the file to the receiver IM terminal according to the file transmission request.

\* \* \* \* \*